United States Patent [19]

Ikemoto et al.

[11] 4,433,593
[45] Feb. 28, 1984

[54] GEAR-TEETH PROTECTOR IN CHANGE-SPEED GEARING UNITS

[75] Inventors: Kazuhito Ikemoto; Nobuaki Katayama; Yukio Terakura, all of Toyota; Kan Sasaki, Aichi, all of Japan

[73] Assignee: Toyota Jidosha Kogyo Kabushiki Kaisha, Aichi, Japan

[21] Appl. No.: 254,266

[22] Filed: Apr. 15, 1981

[30] Foreign Application Priority Data

Sep. 20, 1980 [JP] Japan .......................... 55-117921[U]

[51] Int. Cl.³ ............................................. F16H 57/02
[52] U.S. Cl. ................................. 74/606 R; 184/11 R
[58] Field of Search ................ 74/606 R, 606 A, 608, 74/609; 184/11 R

[56] References Cited

U.S. PATENT DOCUMENTS 2,645,305  7/1953  Roos ...................................... 184/11
4,242,923  1/1981  Nishikawa et al. ............... 74/606 R

FOREIGN PATENT DOCUMENTS 2549990  5/1976  Fed. Rep. of Germany .... 74/606 R
634971  3/1950  United Kingdom ............. 184/11 R Primary Examiner—Leslie A. Braun
Assistant Examiner—Anthony W. Raskob, Jr.
Attorney, Agent, or Firm—Armstrong, Nikaido, Marmelstein & Kubovcik

[57] ABSTRACT

A gear-teeth protector for a change-speed gearing unit in which a pair of upper and lower change-speed gears of high meshing rate and arranged adjacent to an upright wall in a housing for the gearing unit. The gear-teeth protector comprises a shroud plate secured to the upright wall at one side of the change-speed gears to enclose the meshing engagement portion of the gears in forward operation of the gearing unit, the shroud plate being in the form of a side wall extending adjacent to the lower teeth portion of the upper change-speed gear and to the upper teeth portion of the lower change-speed gear.

3 Claims, 7 Drawing Figures

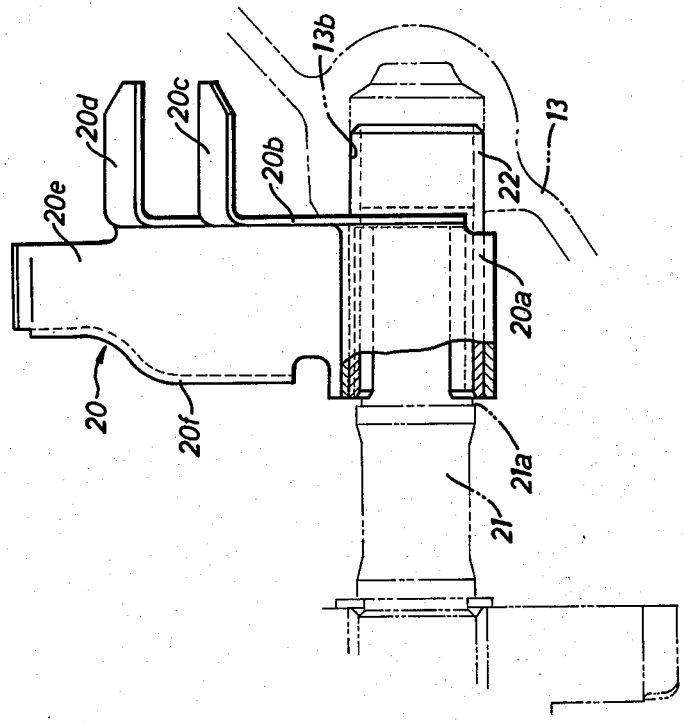
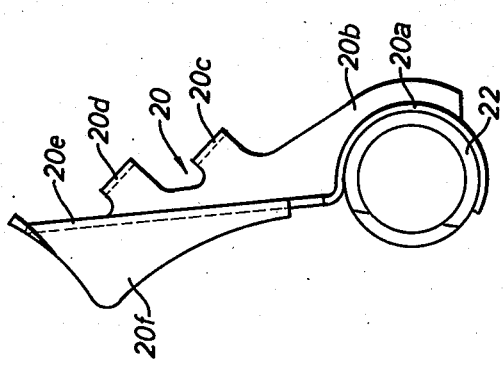

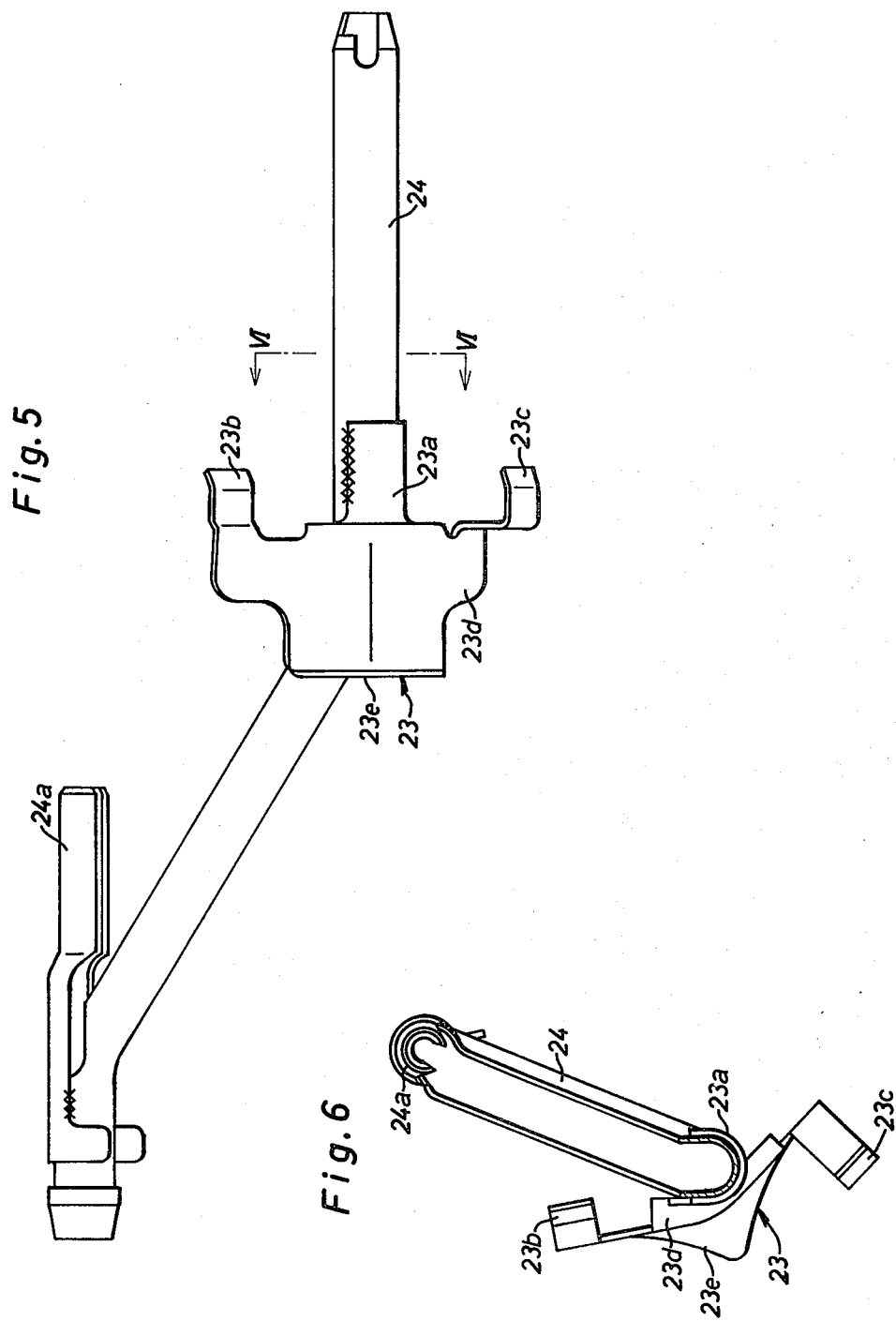

GEAR-TEETH PROTECTOR IN CHANGE-SPEED GEARING UNITS

BACKGROUND OF THE INVENTION

The present invention relates to change-speed gearing units for automobiles, and more particularly to a gear-teeth protector for preventing metallic alien particles being trapped between a pair of change-speed gears of high meshing rate in the gearing unit.

In order to reduce meshing noises of the change-speed gears during high-speed operation of the gearing unit, it is effective to increase the meshing rate of the change-speed gears. In one of the two usual manners for increasing the meshing rate, it is required to make each module of the gears as small as possible, and in the other usual manner it is required to make the whole depth of each tooth on the gears as great as possible. As a result of these requirements, each tooth tip on the gears is inevitably tapered, and the face of each tooth tip becomes narrow, which results in a reduction in the strength of each tooth tip on the gears. In the case that metallic alien matter such as worn-off metallic particles, metallic residue from the grinding of the shaft and gears, etc is trapped between the teeth of the gears, there will occur some damage to the teeth tips on the gears. On the other hand, it is very difficult to completely eliminate the metallic alien particles so as to avoid such damage in the actual use of the gearing unit.

SUMMARY OF THE INVENTION

It is, therefore, a primary object of the present invention to provide a gear-teeth protector for preventing metallic alien particles being trapped between small module gears in a simple construction within the limited space in a change-speed gearing unit.

In a preferred embodiment of the present invention, the above object is accomplished by provision of a gear-teeth protector for a change-speed gearing unit in which a pair of upper and lower change-speed gears of high meshing rate are arranged adjacent to an upright wall in a housing for the gearing unit. The gear-teeth protector comprises a shroud plate secured to the upright wall at one side of the change-speed gears to enclose the meshing engagement portion of the gears in forward operation of the gearing unit, the shroud plate being in the form of a side wall extending adjacent to the lower teeth portion of the upper change-speed gear and to the upper teeth portion of the lower change-speed gear.

It is preferable that the shroud plate be integrally formed at its one side with an inner flange which is arranged to enclose an opening remaining inside the shroud plate around the upper and lower change-speed gears.

Preferably, the shroud plate is integrally formed at its other side with an outer flange and with a pair of lugs which axially extend from the outer flange, the lugs being resiliently engaged with opposite faces of a reinforcement rib of the upright wall to prevent rotation of the shroud plate, and wherein the shroud plate is secured at its lower end to a collar member pressedly mounted within an axial bore in the upright wall.

It is also preferable that the gear-teeth protector further comprises a second shroud plate arranged at the other side of the change-speed gears to enclose the meshing engagement portion of the gears in reverse rotation of the gearing unit, the second shroud plate being in the form of a side wall extending adjacent to the lower teeth portion of the upper change-speed gear and to the upper teeth portion of the lower change-speed gear at the opposite side of the first-named shroud plate.

BRIEF DESCRIPTION OF THE DRAWINGS

Additional objects and advantages of the present invention will be more readily apparent from the following detailed description of a preferred embodiment thereof when taken together with the accompanying drawings, in which:

FIG. 3 is a front view of the right-hand shroud plate shown in FIG. 2;

FIG. 4 is a side view of the shroud plate of FIG. 3;

FIG. 5 is a side view of the left-hand shroud plate shown in FIG. 2;

FIG. 6 is a cross-sectional view taken along the plane of line VI—VI in FIG. 5.

DESCRIPTION OF THE PREFERRED EMBODIMENT

Figure 1:
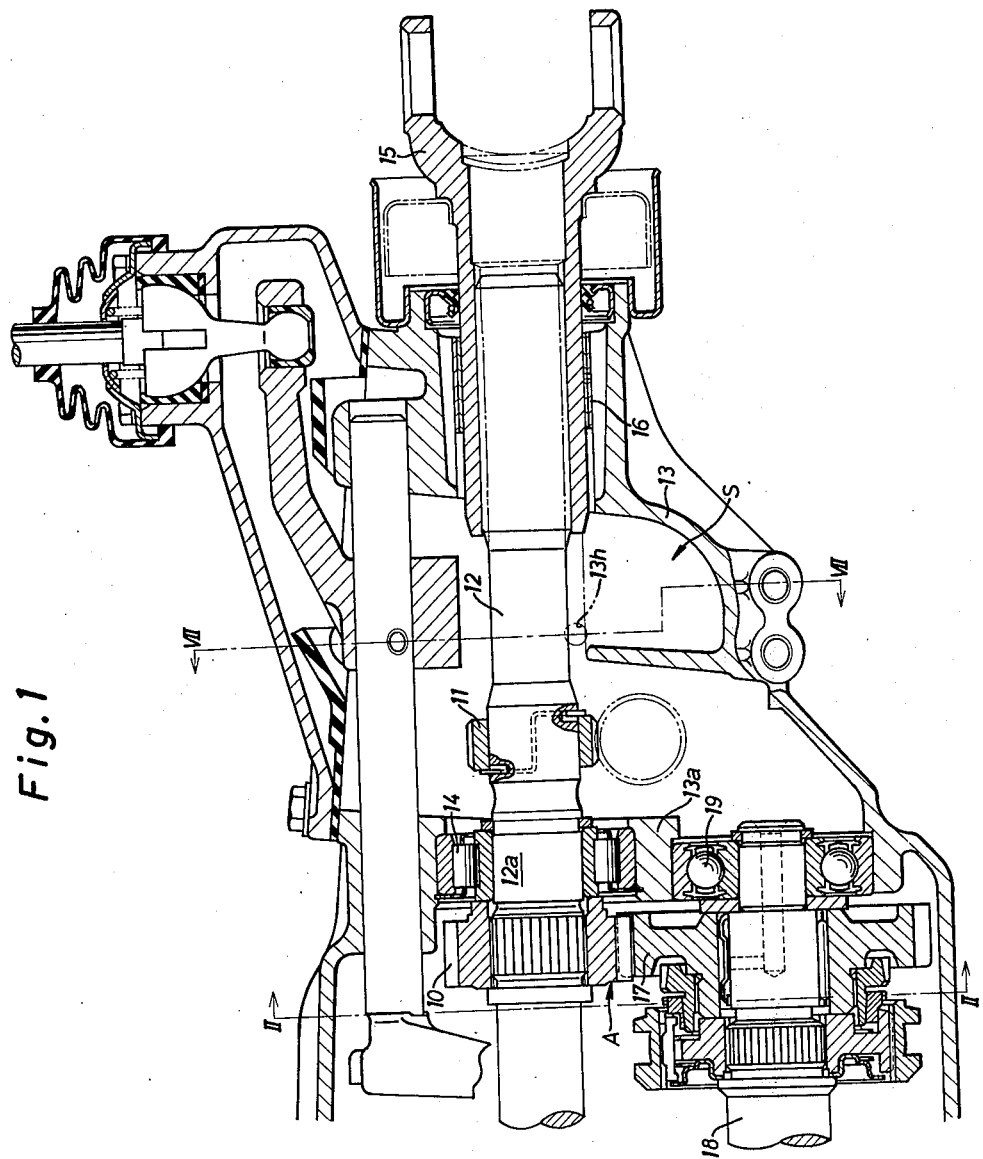
FIG. 1 is a sectional view of a change-speed gearing unit equipped with a gear-teeth protector in accordance with the present invention.

Referring now to the drawings, FIG. 1 illustrates the rear interior of a change-speed gearing unit of the direct operation type, in which an output shaft 12 extends in an axial direction through the interior of an extension housing 13 secured in a fluid-tight manner to a transmission casing (not shown) for the gearing unit. The output shaft 12 is rotatably supported at its intermediate portion 12a by means of a bearing 14 carried in an upright partition wall 13a of housing 13. The output shaft 12 is provided with a fifth-speed driven gear 10 splined thereon and a speedometer drive gear 11 fixed thereto and in mesh with a speedometer driven gear.

The output shaft 12 is splined at its rear end with a sleeve-like yoke 15 which is rotatably and axially slidably supported by a rear bush 16 carried in the rear end portion of extension housing 13. In addition, the rear bush 16 is lubricated by lubricating oil which is stored in an oil well S formed within extension housing 13. In the figure, the liquid surface of the stored lubricating oil is indicated by an imaginary line. A counter-gear shaft 18 is arranged in parallel with output shaft 12 and is rotatably supported by a bearing 19 carried in partition wall 13a. A fifth-speed driven gear 17 is freely rotatable on counter-gear shaft 18 and permanently in mesh with the driven gear 10 to complete a fifth-speed gear train A when engaged with counter-gear shaft 18.

In this embodiment, it is noted that each of gears 10 and 17 is in the form of a small module gear to reduce meshing noises within the extension housing 13 during high-speed operation of the change-speed gearing unit. As can be well seen in FIG. 2, a shroud plate 20 of pressed sheet metal is arranged at the right side of the high speed gear train A. As can be well seen in FIGS. 2, 3 and 4, the shroud plate 20 is welded at its lower end portion 20a to a collar member 22 which is pressedly mounted within an axial mounting hole 13b in upright partition wall 13a. The shroud plate 20 is fixed in place by engagement with the front face of upright wall 13a at its outer flange 20b. A reverse idler shaft 21 is rotatably supported by collar member 22 and has an annular stepped portion 21a which restricts forward displacement of the shroud plate when the collar member 22 is unexpectedly moved in the forward direction. The outer flange 20b of shroud plate 20 is formed with a pair of lugs 20c, 20d which extend in the axial direction. The axial lugs 20c and 20d are resiliently engaged with opposite faces of a reinforcement rib 13c of upright wall 13a to prevent rotation of the shroud plate 20. The shroud plate 20 is in the form of a side wall 20e which is arranged to enclose the lower teeth portion of gear 10 and the upper teeth portion of gear 17 adjacent to the meshing engagement portion of said two gears. The shroud plate 20 is further formed at its front end with an inner flange 20f which is arranged to enclose a front opening remaining inside the side wall 20e around the gears 10 and 17. In addition, it is preferable that the side wall 20e and inner flange 20f of shroud plate 20 be arranged as closely adjacent as possible to the two gears without causing any interference in the operation of the same.

Under inoperative condition of the change-speed gears 10 and 17, metallic alien particles remain at the bottom of extension housing 13. When the stored lubricating oil is picked up by forward rotation of the gears 10 and 17, the metallic alien particles splash against the inner wall of extension housing 13 together with the picked up lubricating oil due to centrifugal force and then rebound toward the outer face of shroud plate 20. Thus, the shroud plate serves to prevent the alien particles being trapped between the gears 10 and 17 and to drop them to the bottom of extension housing 13.

Figure 2:
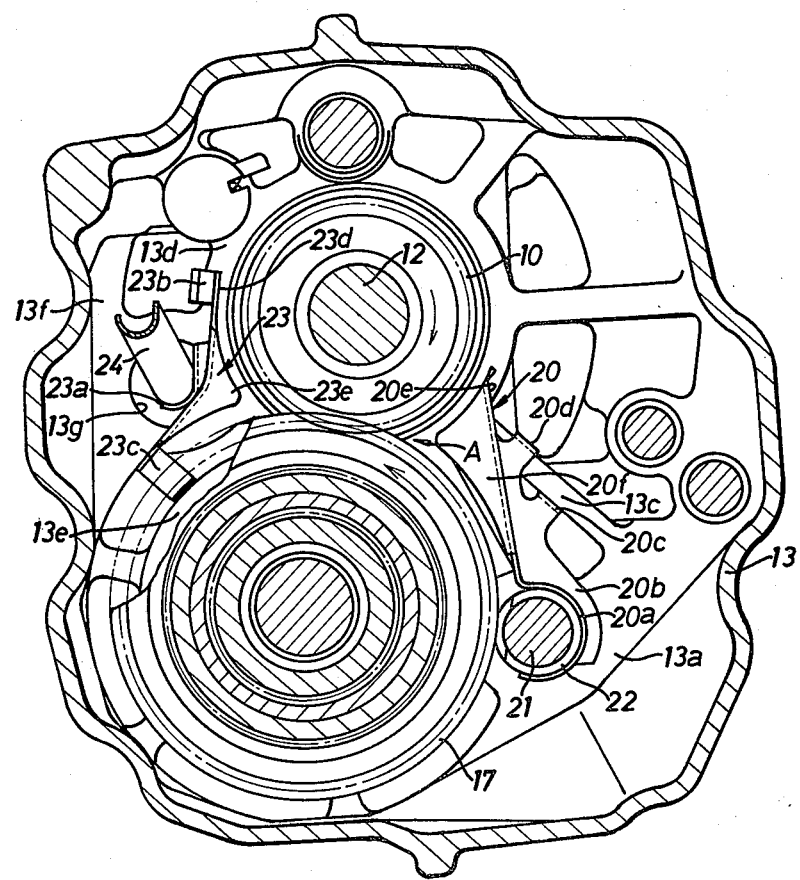
FIG. 2 is a cross-sectional view taken along the plane of line II—II in FIG. 1.

As shown in FIG. 2, another shroud plate 23 of pressed sheet metal is arranged at the left side of gears 10 and 17. As can be well seen in FIGS. 2, 5 and 6, the shroud plate 23 is welded at its central lug 23a to an intermediate portion of an oil transfer trough 24. The shroud plate 23 is formed at its upper and lower ends with a pair of lugs 23b and 23c which are resiliently engaged with bosses 13d and 13e formed on the front face of upright partition wall 13a to prevent rotation of the shroud plate 23 assembled in place. The shroud plate 23 is in the form of a side wall 23d which is arranged to enclose the lower teeth portion of gear 10 and the upper teeth portion of gear 17 adjacent to the meshing engagement portion of said two gears. The shroud plate 23 is formed at its front end with an inner flange 23e which is arranged to cover a front opening remaining inside the side wall 23d around the two gears 10 and 17. In addition, it is preferable that the side wall 23d and inner flange 23e of shroud plate 23 be arranged as closely adjacent as possible to the two gears without causing any interference in the operation of the same.

Figure 7:
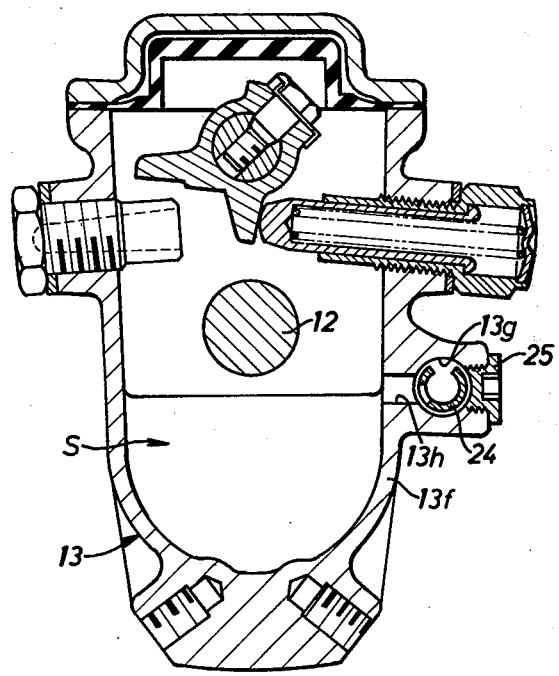
FIG. 7 is a cross-sectional view taken along the plane of line VII—VII in FIG. 1.

As can be well seen in FIGS. 5 and 6, the oil transfer trough 24 is formed with a U-shaped cross-section and is supported in place by means of a clamp member 24a which is pressedly mounted within an axial bore in the side wall of extension housing 13. Thus, the rear end of trough 24 is inserted into an axial bore 13g in the side wall of extension housing 13 and is communicated with the interior of oil well S through a lateral hole 13h in the side wall of extension housing 13. (see FIG. 7) The axial bores are formed during the casting process of extension housing 13, and the lateral hole 13h is formed by drilling and closed by a plug 25 at its outer end.

With the above arrangement, the oil transfer trough 24 serves to supply the lubricating oil from the interior of transmission casing into the oil well S therethrough. When the stored lubricating oil is picked up by reverse rotation of the gears 10 and 17, the metallic alien particles splash against the inner wall of extension housing 13 together with the picked up lubricating oil due to centrifugal force and rebound toward the outer face of shroud plate 23. Thus, the shroud plate 23 serves to prevent the alien particles being trapped between the gears 10 and 17 and to drop them to the bottom of extension housing 13. This serves to avoid damage to the teeth tips on the gears 10 and 17 caused by the alien particles in the reverse operation thereby to enhance durability of the two gears.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a transmission having a housing, an upright wall within said housing, upper and lower change-speed gears arranged in a common vertical plane adjacent to and parallel to the plane of said upright wall and having teeth in meshing engagement with each other, and an oil transfer trough fixed to said upright wall and extending in an axial direction in said housing, a gear-teeth protector comprising first and second shroud plates arranged at both sides of said change-speed gears and forming a pair of side walls enclosing the meshing engagement portion between said two change-speed gears to prevent metallic alien particles being trapped between said change-speed gears, said first shroud plate having a pair of lugs resiliently engaged with said upright wall to prevent rotation of said first shroud plate and a collar member secured to its lower end and pressedly mounted within an axial bore in said upright wall to fasten said first shroud plate in place, and said second shroud plate being secured in place to an intermediate portion of said oil transfer trough and having a pair of lugs resiliently engaged with said upright wall to prevent rotation of said second shroud plate.

2. A gear-teeth protector as claimed in claim 1, wherein the pair of lugs of said first shroud plate are resiliently engaged with opposite faces of a reinforcement rib of said upright wall, and the pair of lugs of said second shroud plate are resiliently engaged with bosses of said upright wall.

3. A gear-teeth protector as claimed in claim 2, wherein each of said shroud plates is integrally formed at its one end with an inner flange which is arranged to enclose an opening around the meshing engagement portion of said two change-speed gears.

* * * * *